I. H. CHAPPELL.
Grain-Drill.

Patented Apr. 16, 1867

Witnesses:
Theo Tusche
J. A. Service

Inventor:
Isaac H. Chappell
Per Munn & Co
Attorneys

I. H. CHAPPELL.
Grain-Drill.

Patented Apr. 16, 1867.

Witnesses:
Thos Tusche
J. A. Service

Inventor:
Isaac H Chappell
Per Munn & Co
Attorneys

United States Patent Office.

ISAAC H. CHAPPELL, OF DECATUR, ILLINOIS, ASSIGNOR TO HIMSELF AND JAMES B. MILLISON.

Letters Patent No. 63,858, dated April 16, 1867.

IMPROVEMENT IN PLANTER AND CULTIVATOR COMBINED.

The Schedule referred to in these Letters Patent and making part of the same

TO ALL WHOM IT MAY CONCERN:

Be it known that I, ISAAC H. CHAPPELL, of Decatur, in the county of Macon, and State of Illinois, have invented a new and useful Improvement in Machine for Cultivating and Planting; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved machine that can be readily adjusted for use either as a cultivator, planter, or seeder; and it consists in the combination of adjustable levers with the beams from which the ploughs and planting apparatus are suspended for the purpose of raising, lowering, and adjusting them; in the combination of the bent levers and cross-bar with the standards to which the ploughs are attached; in making the seat-bar adjustable so that the weight of the driver may be made to bear upon the rollers or the cutters as may be desired; in the device for operating the valve-bar of the seed-boxes; and in the combination of adjustable slides with the valve-bar for the purpose of regulating the amount of seed dropped at a time; the whole being constructed and arranged as hereinafter more fully described.

Figure 1:
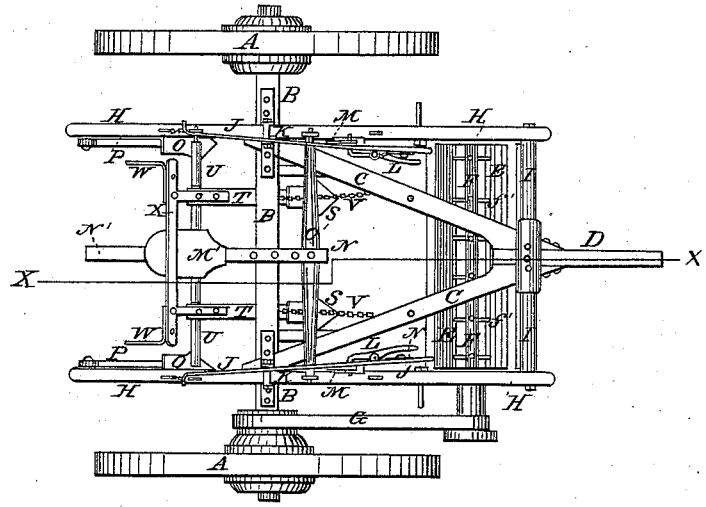
Figure 1 is a top or plan view of my improved machine when arranged for use as a cultivator.
Figure 2:
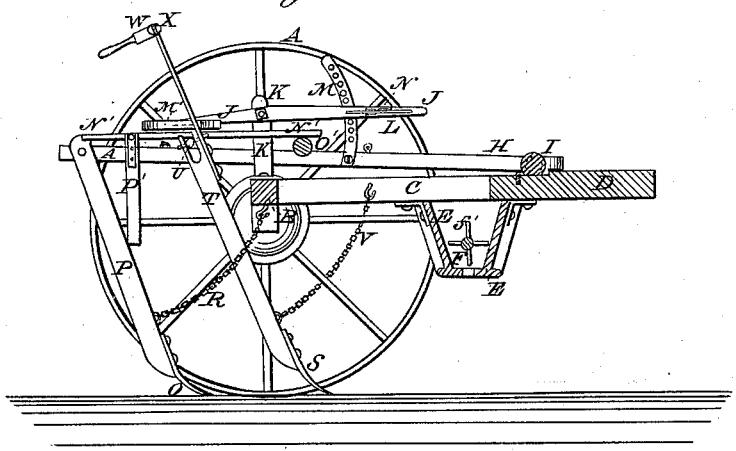
Figure 2 is a vertical longitudinal section of the same taken through the line $x\,x$, fig. 1.
Figure 3:
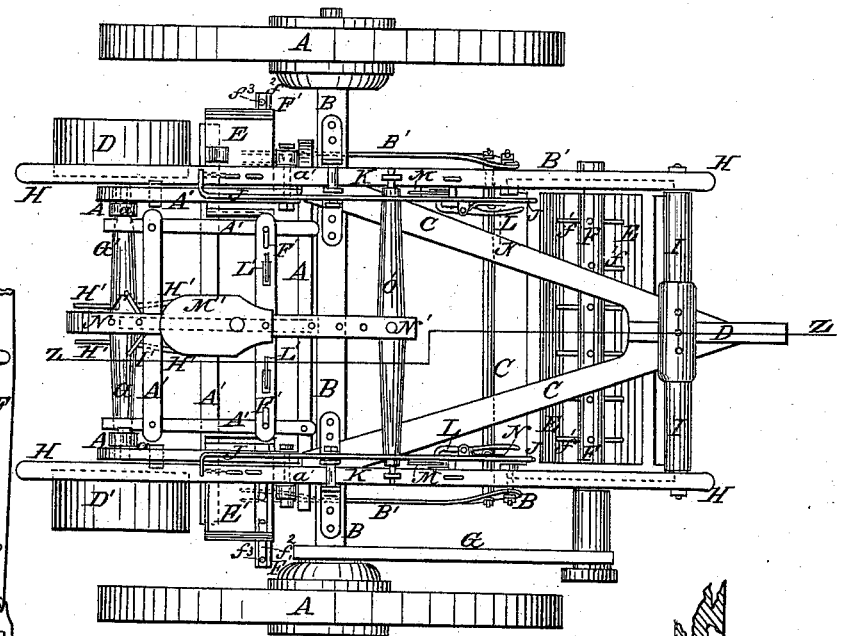
Figure 3 is a top or plan view of the same, when arranged for use as a planter.
Figure 5:
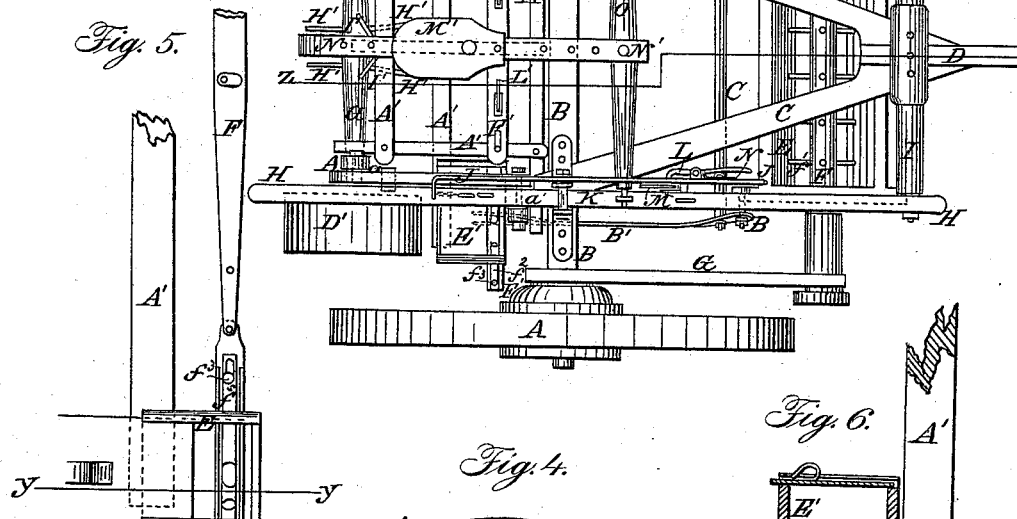
Figure 5 is a detail top view of the seed-box, showing the construction of the adjustable valve-bar.
Figure 6:
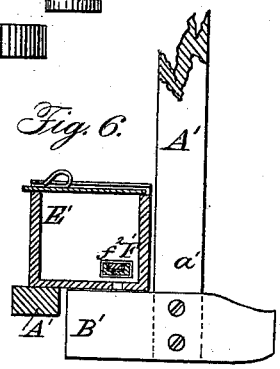
Figure 6 is a detail sectional view of the same taken through the line $y\,y$, fig. 5.
Figure 4:
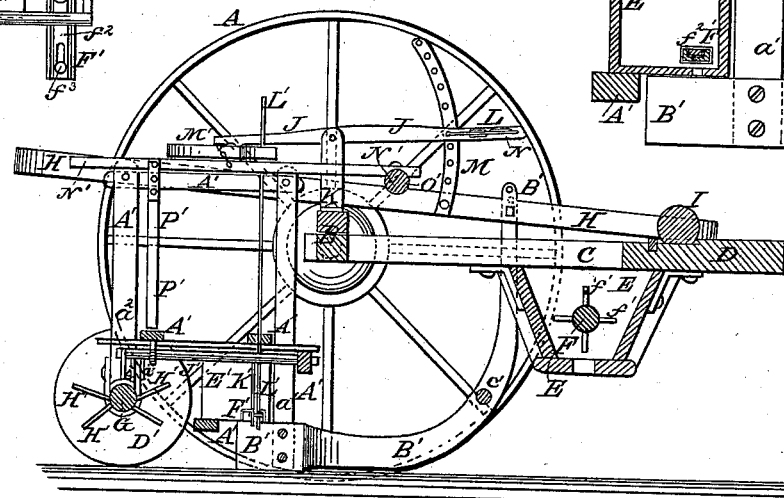
Figure 4 is a vertical longitudinal section of the same taken through the line $z\,z$, fig. 3.

A are the wheels, B is the axle, C the hounds, and D the tongue of the machine. E is the seeding-box which is removably attached to the under side of the hounds C, the seed from which passes out through holes in its bottom. F is a shaft revolving in bearings in the ends of the said box E, and which has radial fingers or stirrers $b'$ projecting from it, as shown in figs. 1, 2, 3, and 4. Motion is given to the shaft F by a band, G, passing around its projecting end, and around a pulley formed upon or attached to the inner end of the hub of one of the wheels A. H are the beams from which the ploughs and planter frame are suspended. The forward ends of the beams H are pivoted to the ends of the cross-bar I, attached to the hounds C, and tongue D; and their rear parts are suspended from the rear ends of the levers J, as shown in the drawings. The levers J are pivoted to the supports K, which also act as guides to keep the beams H in proper position; so that by raising or lowering the forward ends of the levers J, the rear parts of the beams H will be raised or lowered, carrying with them the ploughs or planter suspended from said beams. The levers J and beams H act independently of each other, so that one may be raised or lowered more than the other, or without disturbing the other, as may be desired. The levers J are held in position by the lever stop-pins L, pivoted to the sides of said levers. The rear ends of the levers L are bent over at right angles, and pass through holes in the levers J, and through one or the other of the holes in the curved arms M, the lower ends of which are attached to the beams H. The forward ends of the levers L are forced out, holding the pins to their places in the arms M by the small springs N, one end of which is attached to the levers J, and their other ends press against the said forward ends of the levers L, as shown in figs. 1 and 3. O are the rear ploughs, the upper ends of the standards P of which are pivoted to the rear ends of the beams H, as shown in figs. 1 and 2. The draught upon the ploughs O is sustained by the chains R, the rear ends of which are attached to the lower parts of the standards P, and their forward ends are attached to hooks secured to the axle B, so that the inclination of said standards may be adjusted at will. S are the central ploughs, the upper ends of the standards T of which are pivoted to the shaft U in such a way as to have a side movement. The shaft U is pivoted to the beams H, and the draught upon the ploughs S is sustained and the inclination of the standards T regulated by the chains V, the rear ends of which are attached to the lower parts of the said standards, and their forward ends to hooks secured to the hounds or draught-bars C. W are bent levers, attached to the upper ends of the standards T, by means of which the ploughs S may be moved sidewise, or guided as desired by the driver, to avoid obstructions, or for any other reason. The standards T are made to move together, and are held parallel to each other by the cross-bar X, to which the levers W are pivoted. The side movement of the standards T may be prevented, when not necessary, by passing bolts through the holes in bar X, and in the horizontal arms of the levers W. A' is the frame of the planter, which is attached to the beams H, as shown in figs. 3 and 4, so as to be raised and lowered by the raising and lowering of said beams. B' are the cutters by which the furrows are formed, into which the seed is dropped. The forward ends of the cutters B' are adjustably attached to the forward parts of the beams H by bolts passing through holes in said beams, and through one or the other of the holes through the ends of the said cutters. The cutters B' are held in their proper relative position by the cross-bar or roller C', as shown in figs. 3 and 4. The rear ends of the cutters B' are attached to the front uprights $a'$ of the frame A', and have vertical cavities or openings formed through them, as shown in dotted lines in fig. 3, through which the seed is dropped into the bottom of the furrow formed by the said cutters to be covered by the earth falling back into said furrows as the cutters advance, or by its being pressed in by the rollers D'. E' are the seed-boxes, which are secured to the frame A', directly above the rear ends of the cutters B', and the seed is dropped by the movement of the valve-bar F'. The size of the valves or openings through said bars may be regulated at pleasure, so as to drop any desired quantity of seed at a time by means of the slides $f^2$ placed in grooves in the said bars, and held in any desired position by the set-screws $f^3$, as shown in figs. 5 and 6. D' are the rollers, which are placed directly in the rear of the seed-boxes E', and which are securely attached to the ends of the shaft G', so as to carry the said shaft with them in their revolutions. The shaft G' revolves in bearings in the lower ends of the rear uprights $a^2$ of the frame A', as shown in fig. 4, and has radial arms H' attached to it in such positions as to act alternately upon the arms I', projecting divergently from the under side of the shaft J', so as to partially revolve the said shaft J' back and forth alternately. The shaft J' works in bearings in the frame A', and has an arm, K', projecting downward from its rear end, which passes through a hole in the valve-bar F', so that the said bar may be worked automatically by the advance of the machine. If desired the valve-bar F' may be worked by a lever, L', pivoted to the frame A', one end of which enters a hole in the said bar F', and the other extends up so as to be reached and operated by the driver from his seat. The lever L' may be placed at either side of the driver's seat, or one may be placed on each side as may be desired. M' is the driver's seat, which is attached to an adjustable bar, N', the forward end of which is adjustably attached to the roller or cross-bar O', which is pivoted to the beams H, as shown in figs. 1, 2, 3, and 4, and its rear end is supported by the upright bar P', the lower end of which rests upon the frame A', as shown in fig. 4, and the upper end of which is pivoted to the bar N', so that it may adjust itself to the various positions of the said bar N'. By this construction the position of the seat M' may be changed so as to throw the driver's weight principally upon the cutters B', or upon the rollers D', or so as to divide it equally between them.

What I claim as new, and desire to secure by Letters Patent, is—

1. The combination of the adjustable levers J, with the beams H, substantially as herein shown and described and for the purpose set forth.

2. The combination of the bent levers W, and cross-bar X, with each other and with the standards T of the ploughs S, substantially as herein shown and described and for the purpose set forth.

3. Making the seat bar N' adjustable, substantially as herein shown and described and for the purpose set forth.

4. The combination of the roller-shaft G', arms H' I', shaft J', and arm K', with each other and with the valve-bar F', substantially as herein shown and described and for the purpose set forth.

ISAAC H. CHAPPELL.

Witnesses:
A. W. HARDY,
J. B. MILLISON.